United States Patent [19]

Hawk et al.

[11] 4,270,386

[45] Jun. 2, 1981

[54] INDIRECTLY HEATED THERMAL FLOWMETER

[75] Inventors: Charles E. Hawk, Newport News; Danny K. Livingston, Hampton, both of Va.

[73] Assignee: Teledyne, Inc., Los Angeles, Calif.

[21] Appl. No.: 69,247

[22] Filed: Aug. 23, 1979

[51] Int. Cl.³ ............................................. G01F 1/68
[52] U.S. Cl. ...................................................... 73/204
[58] Field of Search .......................................... 73/204

[56] References Cited

U.S. PATENT DOCUMENTS

| 2,594,618 | 4/1952 | Booth, Jr. | 73/204 |
| 2,896,452 | 7/1959 | Cogniat et al. | 73/204 |
| 3,181,357 | 5/1965 | Benson | 73/204 |
| 3,246,523 | 4/1966 | Richard | 73/204 |

FOREIGN PATENT DOCUMENTS

| 1255331 | 11/1967 | Fed. Rep. of Germany | 73/204 |
| 1195026 | 11/1959 | France | 73/204 |

*Primary Examiner*—Herbert Goldstein
*Attorney, Agent, or Firm*—Cushman, Darby & Cushman

[57] ABSTRACT

A length of conduit is coupled at its ends to a heat sink. A pair of thermocouples are joined to the conduit at spaced points intermediate the ends of the conduit. A closed loop of heat conductive material contacts the conduit midway between the thermocouples. The conductive material is heated, and heat is conducted to the conduit. The thermocouples produce outputs representative of the flow of fluid through the conduit.

18 Claims, 9 Drawing Figures

INDIRECTLY HEATED THERMAL FLOWMETER

BACKGROUND OF THE INVENTION

Thermal flowmeters of type wherein fluid passes through a length of heated conduit and the temperature of one or more points along the conduit is detected to determine flow rate are well known. Examples of such flowmeters are those disclosed in U.S. Pat. Nos. 3,181,357 and 3,229,522 granted to James M. Benson on May 4, 1965 and Jan. 18, 1966, respectively.

In the aforesaid patents, the conduit is directly heated by induced currents. Other types of heated conduit fluid flowmeters employ an insulated heater wire wrapped around the conduit to impart heat thereto.

With respect to known arrangements directly heated by induced currents, stable long term heating of the conduit is achieved. However, the curve plotting temperature gradients along the conduit tends to be flat and AC noise arising from the heating operation is picked up by the thermocouple sensors. Both of these factors adversely affect the sensitivity of the thermocouple outputs, thereby limiting the accuracy of the flow detection.

In the case of systems using an insulated wire heater to heat the conduit, even though the curve of temperature gradients is less flat than in the case of induced current heating, long term stability is not available due to changes in the characteristics of the insulating material.

SUMMARY OF THE INVENTION

The present invention overcomes the deficiencies of previously known arrangements which directly heat the conduit through which the fluid being measured flows. More particularly, according to the invention, the conduit is indirectly heated by joining a loop of heat conductive material to the conduit midway between a pair of thermocouple detectors positioned along the conduit. The conductive loop is heated and heat is transferred to the conduit at the junction of the loop and the conduit. The result is that the temperatures of the conduit measured along its length sharply change in the vicinity of the junction with the heat conductive loop. Additionally, due to the fact that the conduit is not directly heated by current flowing therethrough, no AC noise is detected by the thermocouples.

DETAILS OF THE INVENTION

Illustrative embodiments of the invention now will be described with reference to the accompanying drawings wherein.

Figure 1:
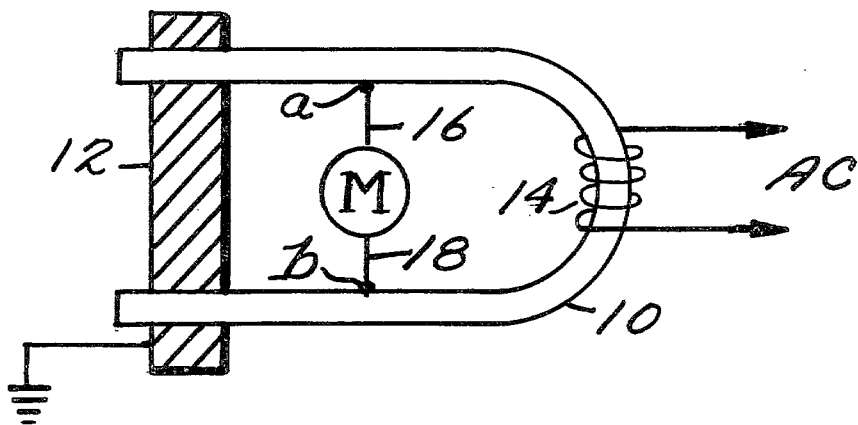
FIG. 1 shows a form of prior art apparatus of background interest to the present invention.

For purposes of background information, a previously known type of heated conduit flowmeter is shown in FIG. 1. This flowmeter is the subject of the aforesaid U.S. Pat. No. 3,181,357.

A length of conduit 10 of electrically and thermally conductive material is formed in a loop and is thermally and electrically coupled at its ends to a heat sink 12. By way of definition, a heat sink as referred to herein is a body of material of such mass that its temperature remains substantially at the ambient temperature of its surroundings, and is not influenced by heating current being passed through it and the conduit. The conduit is of lesser mass and is heated above its ambient surroundings by passage of electrical heating current therethrough.

Continuing to refer to FIG. 1, a winding 14 is wound about the conduit 10 at the central portion of the loop. The winding is energized by alternating current, preferably at high frequency, e.g., in excess of 1,000 hertz. In accordance with the laws of electromagnetic action, the current in winding 14 induces heating currents in the conduit. The temperature of points a and b along the conduit is sensed by joining to these points wires 16 and 18 of a material dissimilar to the metal of the conduit 10. For example, the conduit may be formed of copper and the wires of Constantan. Such an arrangement of dissimilar materials provides thermocouples at points a and b which respond to the temperatures at the respective junctions to produce electrical outputs having values directly related to the temperatures sensed. The wires 16 and 18 are joined through a meter M which displays the difference between the temperatures at junctions a and b. This temperature difference serves as an indication of the flow of fluid through the conduit.

Figure 2:
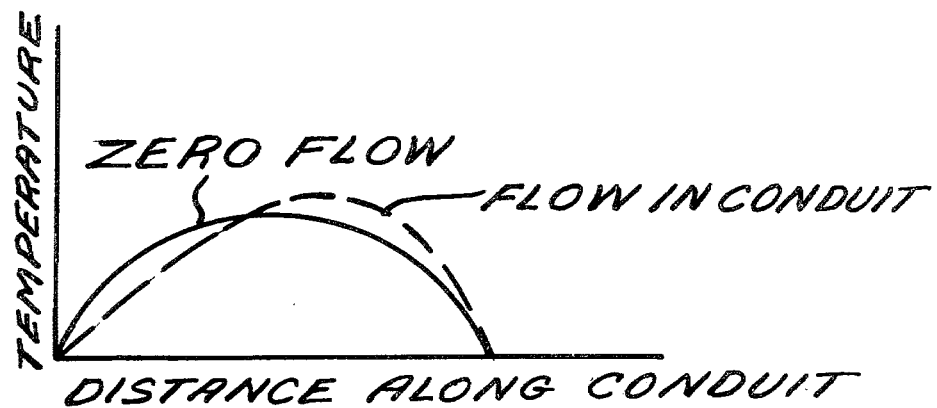
FIG. 2 shows temperature versus conduit length curves obtained in heated conduit flowmeters of the type illustrated in FIG. 1.

FIG. 2 shows a plot of the temperature gradient along the conduit shown in FIG. 1 for different conditions of fluid flow. The solid line curve shows a typical temperature gradient for zero fluid flow, while the dash lines show a typical curve of temperature gradient for flow of fluid through the conduit. As depicted in FIG. 2, when the flow builds up from zero, the temperature along the upstream half of the conduit decreases, while that in the downstream half increases. This permits thermocouples located equidistant from the midpoint of the conduit to detect different temperatures whereby a measurement of fluid flow is obtained.

As can be appreciated from FIG. 2, the curves representing temperature gradients along the conduit are relatively flat. By contrast, in accordance with the present invention, the gradients are substantially steeper whereby changes in fluid flow produce more marked temperature differentials at the thermocouple junctions, thereby increasing the accuracy of the flowmeter.

Figure 3:
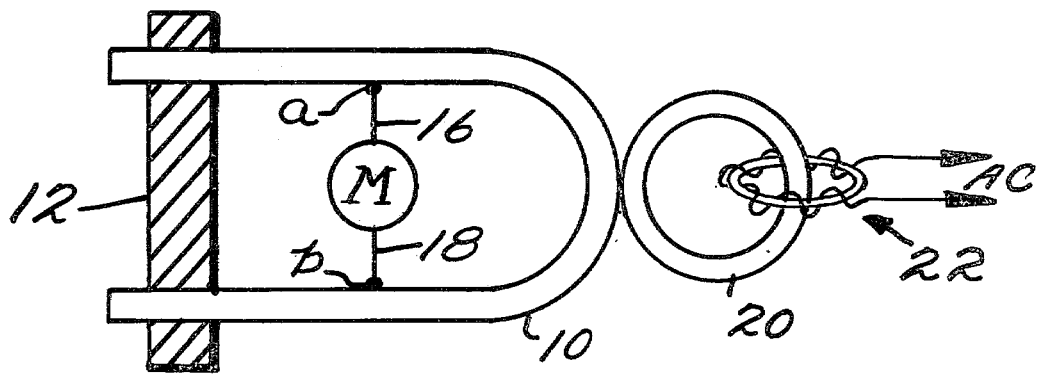
FIG. 3 shows a first embodiment of the present invention.

Referring now to FIG. 3, a first embodiment of the invention will be described. The arrangement depicted is similar to that shown in FIG. 1, except that manner of heating conduit 10 has been changed. More particularly, the winding 14, shown in prior art FIG. 1, which induces a heating current directly in the conduit, has been eliminated in favor of an indirect heating arrangement. A loop 20 of thermally and electrically conductive material is positioned in contacting relationship with the conduit midway between the thermocouples located at points a and b. The loop 20 preferably is welded or brazed to conduit 10, and it is supported by a low thermally conductive electrical insulating material (not shown). A coil 22 surrounds loop 20 whereby energization of the coil by alternating current induces heating current in the loop. The heat thereby generated is conducted to the conduit 10 with the hottest spot resulting at the juncture of loop 20 and conduit 10 through metal to metal joining of the loop and conduit.

Figure 4:
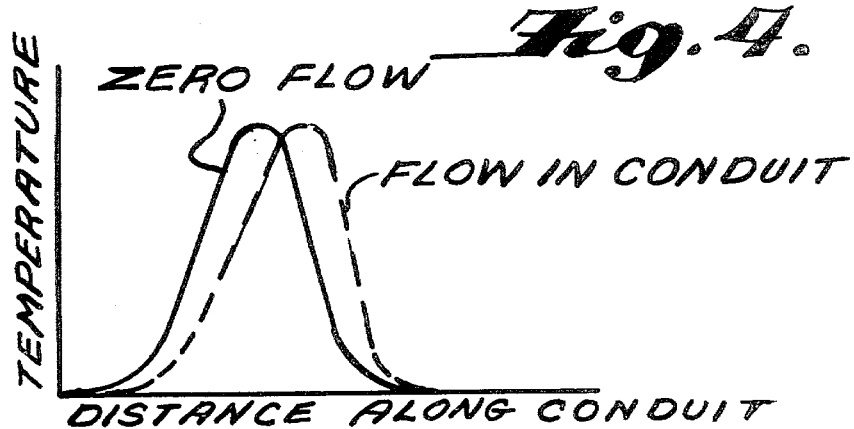
FIG. 4 shows temperature versus conduit length curves obtained with a flowmeter of the type shown in FIG. 3.

Such an arrangement as just described concentrates the heat midway between the thermocouples at points a and b whereby the curve of temperature gradients along the conduit displays steep portions in its bell-shaped configuration (see FIG. 4). By appropriate distancing of points a and b on opposite sides of the junction between loop 20 and conduit 10, a flowmeter of improved sensitivity and accuracy is obtained.

An additional advantage of the arrangement just described is that by inducing heating currents in the loop 20 rather than in conduit 10, no AC flows through the latter. Consequently, AC noise is eliminated from the thermocouple sensors positioned along the conduit.

A still further advantage of the invention is that very little heat is lost to any type of support or attachment members other than the conduit. Consequently, the efficiency of the heating arrangement is high.

Yet another advantage of the invention is that the metal to metal joining of the heated loop to the conduit provides a stable long term heat transfer to the conduit. This eliminates the insulated heaters utilized in prior art flowmeters relying on other heating methods. Such insulated barriers are unpredictable, uncertain and exhibit poor long term stability.

Figure 5A:
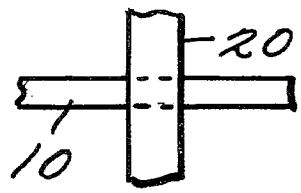
FIGS. 5a–5d show various types of junctions which may be utilized in accordance with the embodiment of FIG. 3 to connect the loop of conductive material to the conduit.
Figure 5B:
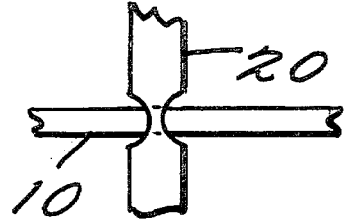
Figure 5C:
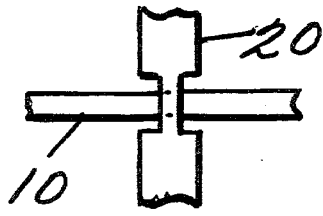
Figure 5D:
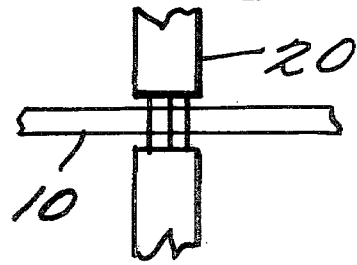

The loop 20 may be constructed in various configurations, as shown in FIGS. 5a–d. A foil band of uniform thickness and width may be employed (FIG. 5a); the foil may be formed with various constrictions at the junction with the conduit (FIGS. 5b and 5c); or a combination of foil and wires may be utilized with the wires engaging the conduit (FIG. 5d). Such arrangements permit the curves of temperature gradients to be varied, thereby altering the signal level of the thermocouple outputs and permitting lower operating temperature and/or a reduction in the power required to heat the conduit.

Figure 6:
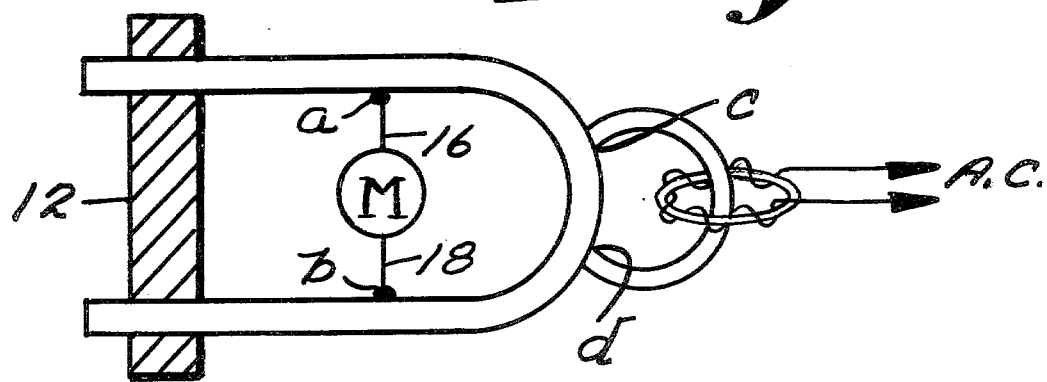
FIG. 6 shows a second embodiment of the present invention.

In the embodiments which have been described, the loop 20 engages the conduit essentially at a single location. However, the advantages of the invention can also be achieved if a portion of the loop 20 includes a segment of the conduit located intermediate the thermocouples. For example, in FIG. 6, the loop 20 engages the conduit at spaced points c and d. Consequently, when heating current is induced in the loop, it passes through that portion of the conduit located between c and d. This has a tendency to somewhat flatten the peak of the bell shape gradient curve, but the curve still maintains its steep characteristics for points along the conduit beyond the segment defined by points c and d. Additionally, AC noise continues to be eliminated from sensing by the thermocouples.

What is claimed is:

1. A fluid flowmeter comprising:
    a segment of electrically and thermally conductive conduit adapted to permit a flow of fluid therethrough, said conduit having ends coupled to a heat sink;
    a pair of thermoelectric sensors operatively associated with said conduit at spaced points along the segment;
    a loop of thermally and electrically conductive material joined to said conduit so as to establish a metal to metal, thermally conductive joint between said loop and conduit intermediate the spaced points; and
    means for inductively heating said loop, the heat induced in said loop being conducted through the metal to metal, thermally conductive joint from the loop to the conduit.

2. A fluid flowmeter as set forth in claim 1, wherein said loop is joined to the conduit at a single location.

3. A fluid flowmeter as set forth in claim 2, wherein said loop is a foil band of uniform width.

4. A fluid flowmeter as set forth in claim 2, wherein said loop is a foil having a constricted cross-section at said location.

5. A fluid flowmeter as set forth in claim 2, wherein said loop includes a foil band having ends joined by at least one wire, said wire engaging the conduit at said location.

6. A fluid flowmeter as set forth in claim 1, wherein said loop is joined to the conduit at spaced locations intermediate said spaced points.

7. A fluid flowmeter as set forth in claim 1, wherein said means for heating the loop comprises a winding supplied with alternating current and arranged with respect to the loop to inductively couple heating current to the loop.

8. A fluid flowmeter as set forth in claim 7, wherein said loop engages the conduit at a single location.

9. A fluid flowmeter as set forth in claim 6 or 8, wherein said loop is a foil band of uniform width.

10. A fluid flowmeter as set forth in claim 6 or 8, wherein said loop is a foil having a constricted cross-section at said location.

11. A fluid flowmeter as set forth in claim 6 or 8, wherein said loop includes a foil band having ends joined by at least one wire, said wire engaging the conduit at said location.

12. A fluid flowmeter as set forth in claim 7, wherein said loop is joined to the conduit at spaced locations intermediate said spaced points.

13. A fluid flowmeter comprising:
    a segment of electrically and thermally conductive conduit adapted to permit a flow of fluid therethrough, the conduit having ends coupled to a heat sink;
    a pair of thermoelectric sensors operatively associated with the conduit at spaced points along the segment;
    a foil band loop of uniform width and being thermally an electrically conductive arranged to physically engage the conduit at a single location intermediate the spaced points; and
    means for heating the foil band loop, whereby heat is conducted from the loop to the conduit where the loop physically engages the conduit.

14. A fluid flowmeter comprising:
    a segment of electrically and thermally conductive conduit adapted to permit a flow of fluid therethrough, the conduit having ends coupled to a heat sink;
    a pair of thermoelectric sensors operatively associated with the conduit at spaced points along the segment;
    a loop of thermally and electrically conductive foil arranged to physically engage the conduit at a single location intermediate the spaced points, the loop having a constricted cross-section at the single location; and means for heating the loop whereby heat is conducted from the loop to the conduit where the loop physically engages the conduit.

15. A fluid flowmeter comprising:

a segment of electrically and thermally conductive conduit adapted to permit a flow of fluid therethrough, the conduit having ends coupled to a heat sink;

a pair of thermoelectric sensors operatively associated with the conduit at spaced points along the segment;

a loop of thermally and electrically conductive material arranged to physically engage the conduit at a single location intermediate the spaced points, the loop comprising a foil band having ends joined by at least one wire, the wire engaging the conduit at the single location; and means for heating the loop whereby heat is conducted from the loop to the conduit where the loop physically engages the conduit.

16. A fluid flowmeter comprising:

a segment of electrically and thermally conductive conduit adapted to permit a flow of fluid therethrough, the conduit having ends coupled to a heat sink;

a pair of thermoelectric sensors operatively associated with the conduit at spaced points along the segment;

a foil band loop of uniform width and being thermally and electrically conductive arranged to physically engage the conduit at a single location intermediate the spaced points; and means for heating the loop whereby heat is conducted from the loop to the conduit where the loop physically engages the conduit, the means for heating comprising a winding supplied with alternating current and arranged with respect to the loop to inductively couple heating current to the loop.

17. A fluid flowmeter comprising:

a segment of electrically and thermally conductive conduit adapted to permit a flow of fluid therethrough, the conduit having ends coupled to a heat sink;

a pair of thermoelectric sensors operatively associated with the conduit at spaced points along the segment;

a foil loop of thermally and electrically conductive material arranged to physically engage the conduit at a single location intermediate the spaced points, the foil loop having a constricted cross-section at the single location; and means for heating the loop whereby heat is conducted from the loop to the conduit where the loop physically engages the conduit, the means for heating comprising a winding supplied with alternating current and arranged with respect to the loop to inductively couple current to the loop.

18. A fluid flowmeter comprising:

a segment of electrically and thermally conductive conduit adapted to permit a flow of fluid therethrough, the conduit having ends coupled to a heat sink;

a pair of thermoelectric sensors operatively associated with the conduit at spaced points along the segment;

a loop of thermally and electrically conductive material arranged to physically engage the conduit at a single location intermediate the spaced points, the loop comprising a foil band having ends joined by at least one wire, the wire engaging the conduit at the single location; and means for heating the loop whereby heat is conducted from the loop to the conduit where the loop physically engages the conduit, the means for heating comprising a winding supplied with alternating current and arranged with respect to the loop to inductively couple current to the loop.

* * * * *